(12) United States Patent
Hidaka et al.

(10) Patent No.: US 12,347,244 B2
(45) Date of Patent: Jul. 1, 2025

(54) ABNORMALITY DETERMINATION PARKING SUPPORT DEVICE, METHOD, AND SYSTEM

(71) Applicant: DENSO CORPORATION, Kariya (JP)

(72) Inventors: Takamasa Hidaka, Kariya (JP); Koudai Yamaura, Kariya (JP); Masatake Wada, Kariya (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 17/982,181

(22) Filed: Nov. 7, 2022

(65) Prior Publication Data
US 2023/0058947 A1  Feb. 23, 2023

Related U.S. Application Data

(63) Continuation of application No. PCT/JP2021/017064, filed on Apr. 28, 2021.

(30) Foreign Application Priority Data

May 20, 2020 (JP) .................... 2020-088229

(51) Int. Cl.
| | |
|---|---|
| *G07C 5/00* | (2006.01) |
| *B60R 25/24* | (2013.01) |
| *B60W 30/06* | (2006.01) |
| *G06Q 50/10* | (2012.01) |

(52) U.S. Cl.
CPC .............. *G07C 5/008* (2013.01); *B60R 25/24* (2013.01); *B60W 30/06* (2013.01); *G06Q 50/10* (2013.01); *G06Q 2240/00* (2013.01)

(58) Field of Classification Search
CPC ................................ G07C 5/005; B60R 25/24
See application file for complete search history.

(56) References Cited

U.S. PATENT DOCUMENTS

| | | | |
|---|---|---|---|
| 2019/0283736 A1 | 9/2019 | Watanabe | |
| 2020/0062199 A1* | 2/2020 | Kwon | H02H 3/085 |
| 2020/0130676 A1* | 4/2020 | Smid | B60W 30/06 |
| 2020/0180607 A1* | 6/2020 | Choi | G08G 1/164 |
| 2020/0198620 A1 | 6/2020 | Nakata | |

(Continued)

FOREIGN PATENT DOCUMENTS

| | | |
|---|---|---|
| CN | 108961104 A | 12/2018 |
| CN | 111127946 A | 5/2020 |

(Continued)

*Primary Examiner* — Jess Whittington
(74) *Attorney, Agent, or Firm* — Harness, Dickey & Pierce, P.L.C.

(57) ABSTRACT

A parking support device configured to support an automatic valet parking of a vehicle includes: an abnormality determiner configured to determine a presence or absence of an abnormality in an automatically driven vehicle when the automatically driven vehicle moves in a parking facility by automatic driving; and a notification instructor configured to issue, when determining an abnormality, a notification instruction for a portable terminal device held by a user of the automatically driven vehicle, notifying contents including (i) collection information indicating a collection position where the user should collect the automatically driven vehicle, and (ii) prompter information prompting that the user should go to the collection position.

7 Claims, 9 Drawing Sheets

(56) References Cited

U.S. PATENT DOCUMENTS

| 2021/0122362 A1* | 4/2021 | Okamura | G05D 1/0011 |
| 2021/0229655 A1* | 7/2021 | Amadi | B60W 30/06 |

FOREIGN PATENT DOCUMENTS

| JP | 2011054116 A | 3/2011 |
| JP | 2019026067 A | 2/2019 |
| JP | 2019160086 A | 9/2019 |

* cited by examiner

ABNORMALITY DETERMINATION PARKING SUPPORT DEVICE, METHOD, AND SYSTEM

CROSS REFERENCE TO RELATED APPLICATION

This application is a continuation application of International Patent Application No. PCT/JP2021/017064 filed on Apr. 28, 2021, which designated the U.S. and claims the benefit of priority from Japanese Patent Application No. 2020-088229 filed on May 20, 2020. The entire disclosure of the above application is incorporated herein by reference.

TECHNICAL FIELD

The present disclosure relates to a parking support device configured to support parking of a vehicle, a parking support method performed by the parking support device, a parking support system including the parking support device, a non-transitory computer readable storage medium storing a parking support program, and a portable terminal device.

BACKGROUND

For example, a relevant art discloses, as a parking support system, a technique of automatic valet parking in which a management device of a parking lot/parking facility guides an automatically driven vehicle from an occupant unload area to a parking position in a parking area, without taking into consideration a possibility of having an abnormality when the automatically driven vehicle moves in the parking lot. As a result of an inventor's detailed study, it has been found as an issue that if an abnormality occurs in the vehicle after the driver gets off, the automatically driven vehicle cannot move in the parking lot and hinders the movement of other automatically driven vehicle(s).

SUMMARY

One embodiment of the present disclosure is a management device, which is a parking support device configured to support parking of a vehicle. An automatically driven vehicle is a vehicle configured to enable automatic driving along a guidance route set by the parking support device in a parking facility provided with getting on-off areas and a parking area respectively having a plurality of sections.

The parking support device includes an abnormality determiner and a notification instructor. The abnormality determiner is configured to determine the presence or absence of an abnormality in the automatically driven vehicle when the automatically driven vehicle moves by automatic driving in the parking facility. The notification instructor is configured to issue, when determining an abnormality, a notification instruction for a portable terminal device held by a user of the automatically driven vehicle, notifying contents including (i) collection information indicating a collection position where the user should collect (e.g., picks up or gets in) the automatically driven vehicle, and (ii) prompter information prompting that the user should go to the collection position.

EMBODIMENTS FOR CARRYING OUT DISCLOSURE

Embodiments of the present disclosure are described below with reference to the drawings.

One aspect of the present disclosure is to make it less prone for a parking support device, which is configured to support parking of a vehicle, to hinder the move of other automatically driven vehicles even when an abnormality occurs in the automatically driven vehicle.

As described above, the one embodiment of the present disclosure is a management device, which is a parking support device configured to support parking of a vehicle. An automatically driven vehicle is a vehicle configured to enable automatic driving along a guidance route set by the parking support device in a parking facility provided with getting on-off areas and a parking area respectively having a plurality of sections.

The parking support device includes an abnormality determiner and a notification instructor. The abnormality determiner is configured to determine the presence or absence of an abnormality in the automatically driven vehicle when the automatically driven vehicle moves by automatic driving in the parking facility. The notification instructor is configured to issue, when determining an abnormality, a notification instruction for a portable terminal device held by a user of the automatically driven vehicle, notifying contents including (i) collection information indicating a collection position where the user should collect (e.g., picks up or gets in) the automatically driven vehicle, and (ii) prompter information prompting that the user should go to the collection position.

According to such a configuration, via the portable terminal device held by the user, the park support device is capable of notifying the user of the collection position and of notifying that the user should go to the collection position, i.e., that he/she should quickly move to the collection position to move the automatically driven vehicle. Therefore, even when an abnormality occurs in the automatically driven vehicle, the park support device is made to be less prone to hinder the move of other automatically driven vehicles.

1. Embodiment

1-1. Configuration of Parking Support System 1

Figure 1:
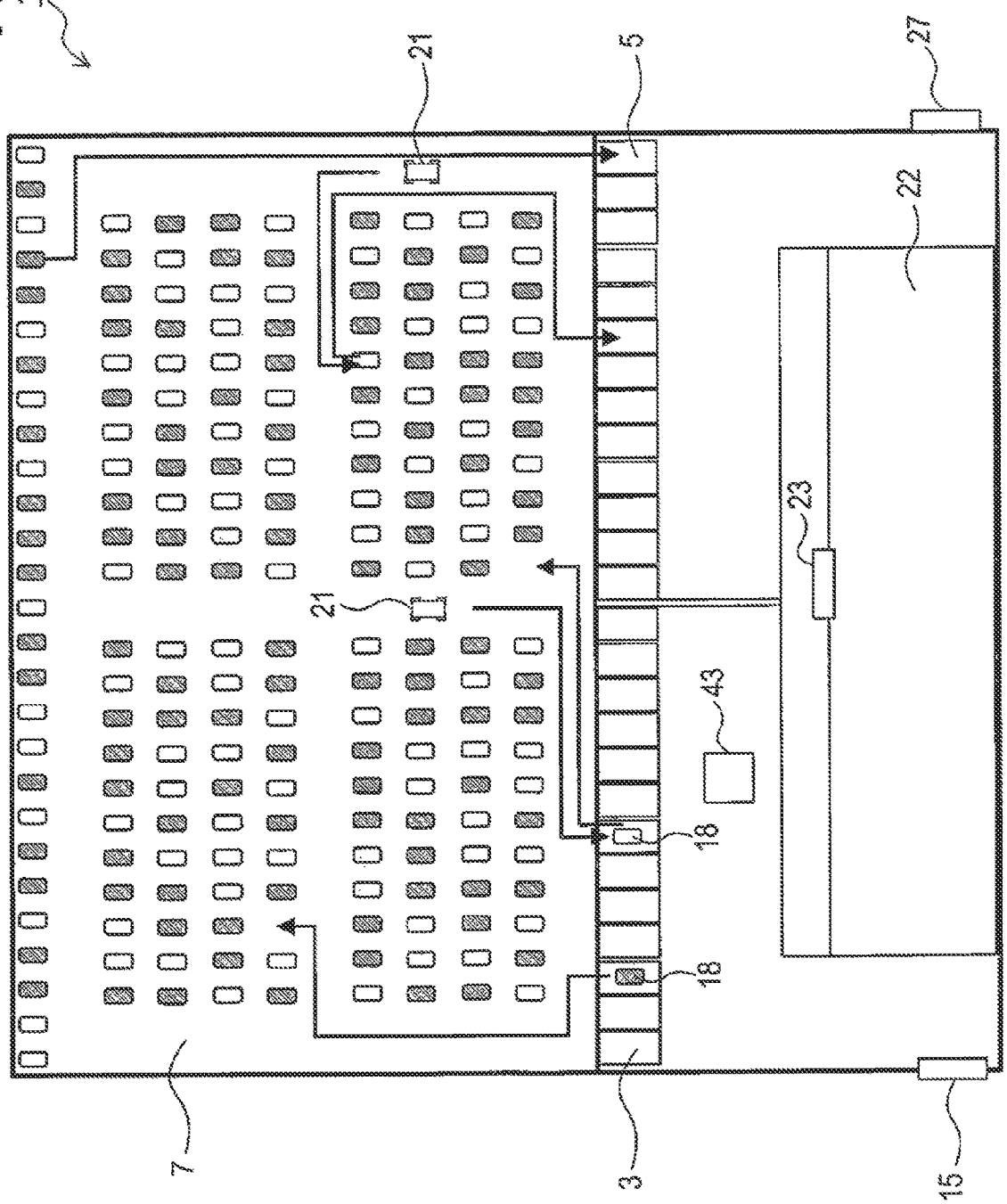
FIG. 1 is a plan view of a parking facility.
Figure 2:
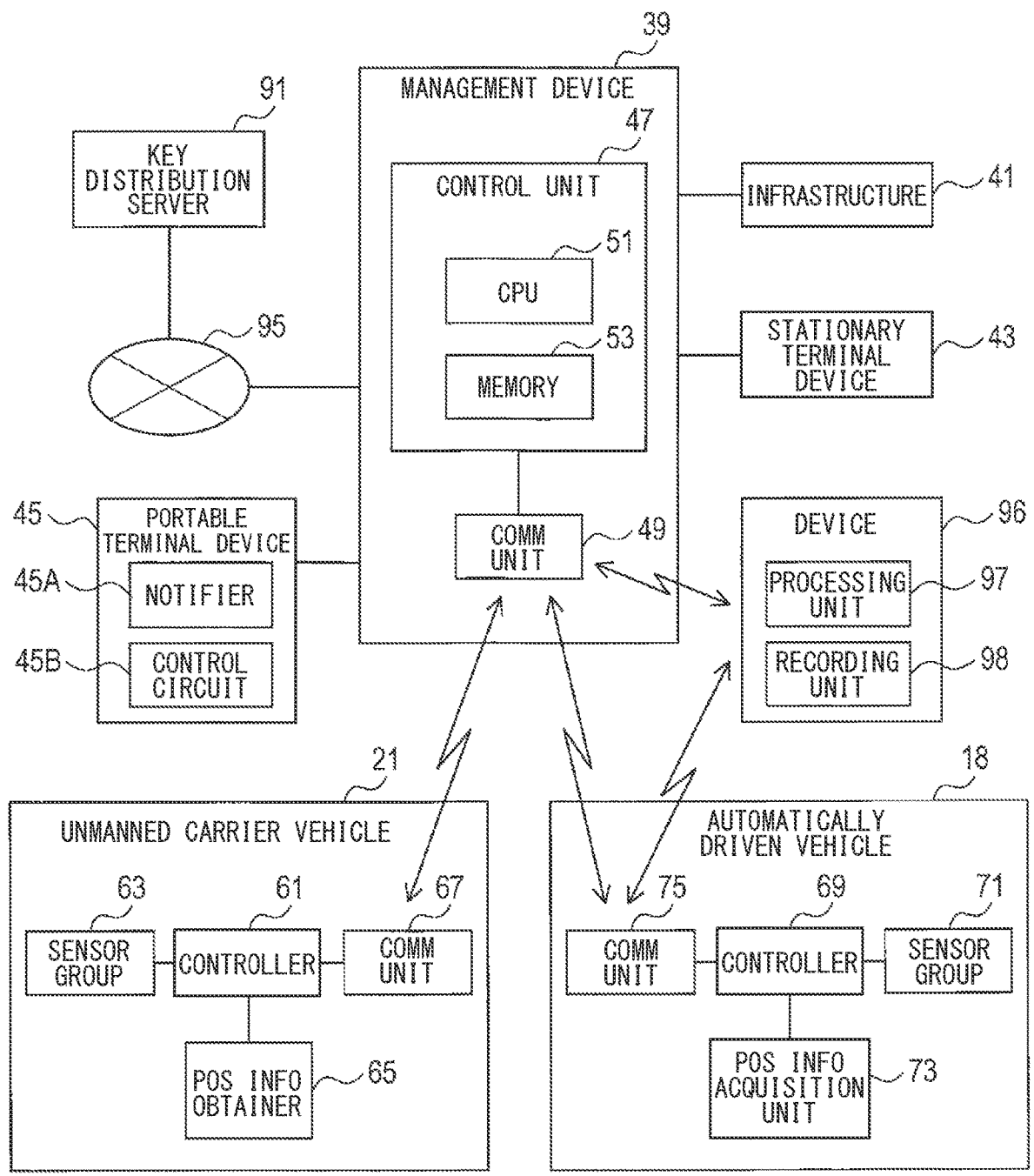
FIG. 2 is a block diagram showing a configuration of a parking support system.
Figure 3:
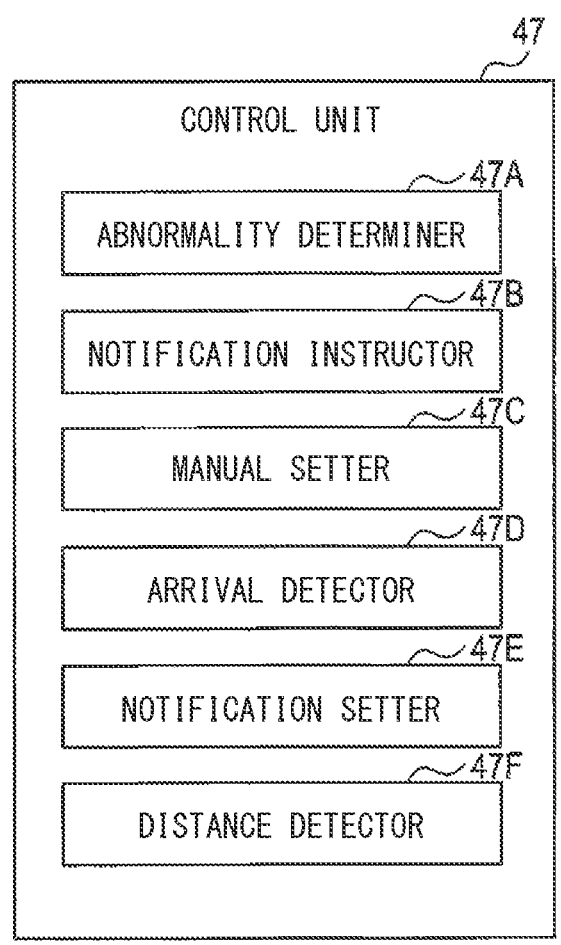
FIG. 3 is a diagram of functional blocks in a control unit of a management device.

The following describes a configuration of a parking support system 1 with reference to FIG. 1 to FIG. 3. As shown in FIG. 1, the parking support system 1 includes a park-in lot 3 set as an area where a user gets off from a vehicle, and a park-out lot 5 set as a boarding area where the user gets on the vehicle, and a parking area 7.

Note that, in the following, an area including the park-in lot 3, the park-out lot 5, and the parking area 7 may also be referred to as a parking facility. Further, an area including the park-in lot 3 and the park-out lot 5 may also be referred to as getting on-off areas 3 and 5. The park-in lot 3 and the park-out lot 5 are provided with multiple sections. The park-in lot 3 is connected to an outside area of the parking support system 1 through an entrance 15. An automatically driven vehicle 18 enters into the park-in lot 3 through the entrance 15. The automatically driven vehicle 18 has an automatic valet parking function.

It should be noted that the automatically driven vehicle 18 only needs to be able to carry out the automatic valet parking function in the parking facility, and does not need to have an automatic driving function outside the parking facility. Further, the automatic valet parking function includes a function of traveling from the park-in lot 3 to a parking position in the parking area 7 and parking by automatic driving, and a function of traveling from the parking position in the parking area 7 to the park-out lot 5. Further, the automatic valet parking function includes a function of traveling to move in the parking area 7 when another vehicle enters into or leaves the parking area 7.

The automatic valet parking function, in particular, includes a function of repeatedly acquiring the position information of the automatically driven vehicle 18 and transmitting it to a management device 39 which serves as a parking support device of the present disclosure, and a function of repeatedly receiving a guidance route from the management device 39 and controlling a travel of the automatically driven vehicle 18 according to the guidance route. Note that the position information of the automatically driven vehicle 18 indicates an estimation result of a current position of the automatically driven vehicle 18, and includes, for example, coordinates of the current position within an area of the parking facility.

The park-in lot 3 and the park-out lot 5 is adjacent to an entrance 23 of a facility 22 such as a store. An occupant of the automatically driven vehicle 18, which has entered into the park-in lot 3, gets off the automatically driven vehicle 18, and can walk to the entrance 23.

The park-out lot 5 is connected to the outside area of the parking support system 1 through an exit 27. The automatically driven vehicle 18 can move from the park-out lot 5 to the outside of the parking support system 1 through the exit 27. The park-out lot 5 is adjacent to the entrance 23. The occupant can walk from the entrance 23 to the park-out lot 5.

The parking area 7 is a place where a plurality of automatically driven vehicles 18 can be parked. A plurality of sections are provided in the parking area 7. Each section provided in the park-in lot 3, the park-out lot 5, and the parking area 7 is an area in which one automatically driven vehicle 18 can be parked. However, the parking area 7 needs not have such section.

The automatically driven vehicle 18 can travel from the park-in lot 3 to the parking area 7. Further, the automatically driven vehicle 18 can travel from the parking area 7 to the park-out lot 5.

As shown in FIG. 2, the parking support system 1 includes the management device 39, an infrastructure 41, a stationary terminal device 43, and a portable terminal device 45. The parking support system 1 includes a plurality of unmanned carrier vehicles 21, which respectively include a controller 61, a sensor group 63, a position information obtainer 65, and a communication unit 67.

The unmanned carrier vehicle 21 can travel in a state, for example, in which any vehicle including an automatically driven vehicle 18 is carried thereon (hereinafter, referred to as a carry state). Further, the unmanned carrier vehicle 21 can make a transition between a non-carry state and the carry state by getting under a vehicle and lifting the vehicle. Further, the unmanned carrier vehicle 21 has a function of automatically driving to a target position along the guidance route provided by the management device 39.

The unmanned carrier vehicle 21 can carry the vehicle to the target position by automatically driving the vehicle to the target position along the guidance route in the carry state. The vehicle carried by the unmanned carrier vehicle 21 may be an automatically driven vehicle 18 or a vehicle that is not an automatically driven vehicle 18, that is, a vehicle that does not have an automatic driving function.

The unmanned carrier vehicle 21 holds map information about the parking facility. The unmanned carrier vehicle 21 uses the map information, for example, when performing automatic driving. The unmanned carrier vehicle 21 uses the position information when performing automatic driving. The unmanned carrier vehicle 21 can communicate with the management device 39.

The management device 39 includes a control unit 47 and a communication unit 49. The control unit 47 includes a microcomputer having a CPU 51 and a semiconductor memory (hereinafter referred to as a memory 53) such as a RAM, a ROM, or the like, for example.

The CPU 51 executes a program stored in a non-transitory, tangible storage medium to perform functions to be provided by the control unit 47. The program includes a parking support program of the present disclosure. In this example, the memory 53 corresponds to a non-transitory, tangible storage medium storing the program. Further, when the program is executed, a method corresponding to the program is performed. Note that the control unit 47 may include one microcomputer, or more than one microcomputer.

The control unit 47 has a configuration for transmitting, to the automatically driven vehicle 18 and the unmanned carrier vehicle 21, a guidance route to the parking position and a start instruction for a start of parking or a start of leaving the parking facility. When moving the automatically driven vehicle 18, the control unit 47 sets a guidance route from the current position of the automatically driven vehicle 18 to the target position, and transmits the guidance route and the start instruction to the automatically driven vehicle 18. Then, the automatically driven vehicle 18 moves according to the guidance route.

Further, when moving an arbitrary vehicle to be carried, including a vehicle other than the automatically driven vehicle 18, the control unit 47 sets a guidance route from the current position of the unmanned carrier vehicle 21 to the target position via the current position of the arbitrary vehicle. Then, the control unit 47 transmits the guidance route and the start instruction to the unmanned carrier vehicle 21. Then, the unmanned carrier vehicle 21 moves according to the guidance route and carries the vehicle to be carried to the target position.

As shown in FIG. 3, for example, the control unit 47 includes an abnormality determiner 47A, a notification instructor 47B, a manual setter 47C, an arrival detector 47D, a notification setter 47E, and a distance detector 47F. The operation of each unit 47A to 47F constituting the control unit 47 is described later.

Map information of the parking facility is recorded in the memory 53. Further, the map information includes information indicating a state of the section in the parking area 7. The state of section may be an available state where the section is vacant (hereinafter referred to as a vacant state) and an unavailable state where the section is occupied by the automatically driven vehicle 18 (hereinafter referred to as an occupied state). The communication unit 49 is configured to be capable of communicating with the automatically driven vehicle 18.

The infrastructure 41 has a function of acquiring information representing an internal situation of the parking support system 1 (hereinafter referred to as inside parking facility information) and supplying the inside parking facility information to the management device 39. The infrastructure 41 includes a sensor that measures a size of the vehicle in the park-in lot 3, a camera that images an inside of the parking facility, a LIDAR (Laser Imaging Detection and Ranging), and the like.

The inside parking facility information includes, for example, information representing a position of obstacle, information representing a status of each section in the parking area 7, position information of the automatically driven vehicle 18 in the parking Support system 1, and the like.

As shown in FIG. 1, the stationary terminal device 43 is installed in the vicinity of the park-in lot 3. The stationary terminal device 43 outputs a parking request signal in response to a parking request which is an input operation indicative of a user intention to park the automatically driven vehicle 18, for example. The parking request signal is a request signal for carrying the automatically driven vehicle 18 in the park-in lot 3 to the parking area 7 and parking the vehicle 18. Further, the stationary terminal device 43 outputs identification information of the automatically driven vehicle 18 and the like when outputting the signal corresponding to the input operation to the management device 39.

Further, the stationary terminal device 43 outputs a park-out request signal in response to a park-out request, that is, an input operation indicative of a user intention to pick up the automatically driven vehicle 18 (i.e., to ride the vehicle 18 and exit from the parking facility). The park-out request signal is a signal requesting that the automatically driven vehicle 18 parked in the parking area 7 is guided to the park-out lot 5.

Further, the stationary terminal device 43 outputs the identification information of the automatically driven vehicle 18 in response to an input operation, for example. The identification information includes, for example, a license plate information for identifying the automatically driven vehicle 18.

The portable terminal device 45 is a device held by an occupant of the automatically driven vehicle 18, and is configured to be communicable with the management device 39. The portable terminal device 45 repeatedly transmits information on the current position of the portable terminal device 45 to the management device 39. Further, the portable terminal device 45 includes a notifier 45A. The notifier 45A includes, for example, a display and a speaker, and a control circuit 45B for controlling them, and the portable terminal device 45 is configured as, for example, a smartphone equipped with these. In the portable terminal device 45, the notifier 45A notifies the occupant by an image or voice in response to an instruction from the management device 39. Note that the notification to the occupant includes a notification performed when the occupant holding the portable terminal device 45 gets off the automatically driven vehicle 18. The control circuit 45B corresponds to an example of a control unit in the portable terminal device 45.

As described above, the automatically driven vehicle 18 has an automatic valet parking function. As shown in FIG. 2, the automatically driven vehicle 18 includes a controller 69, a sensor group 71, a position information acquisition unit 73, and a communication unit 75.

The controller 69 controls various parts of the automatically driven vehicle 18. The automatic driving function is realized by a control of the controller 69. The automatically driven vehicle 18 acquires, from the management device 39, the map information of the parking facility and the guidance route, and when performing the automatic driving, the automatically driven vehicle 18 uses the acquired map information and the guidance route.

The sensor group 71 is configured to acquire field information indicating a situation around the automatically driven vehicle 18. The content of the field information includes, for example, a position of an obstacle existing near the automatically driven vehicle 18. The sensor group 71 may include a camera, a LIDAR, and the like. The automatically driven vehicle 18 uses the field information when performing the automatic driving.

The position information acquisition unit 73 acquires the position information of the automatically driven vehicle 18. The position information acquisition unit 73 is, for example, a position estimation system using a LIDAR and a map. The automatically driven vehicle 18 uses the position information when performing the automatic driving. The communication unit 75 is configured to be capable of performing communication with the management device 39. The parking support system 1 further includes a device 96, as shown in FIG. 2. The device 96 is an arbitrary device held by a person other than the user, such as a rewritable remote control key and a smartphone. In the present embodiment, the device 96 is held by a manager of the parking facility. The device 96 can wirelessly communicate with the automatically driven vehicle 18 and the management device 39.

The device 96 includes a processing unit 97 and a recording unit 98. The processing unit 97 includes a microcomputer having a CPU and a memory which are not shown in the drawing. The processing unit 97 acquires a virtual key from the outside of the device 96, processes the acquired virtual key in the recording unit 98, and performs a process of using the virtual key as a key of the automatically driven vehicle 18. These processes are described later.

1-2. Process

Next, a notification process performed by the management device 39 is described with reference to a flowchart of FIG. 4. The notification process is a process that notifies the user (e.g., a driver) of the automatically driven vehicle 18 to return to the automatically driven vehicle 18, by monitoring abnormality of the automatically driven vehicle 18 with management device 39 and by detecting the one after the user gets off the vehicle 8 in the park-in lot 3. Alternatively, it is a process at an occasion when having an abnormality in the automatically driven vehicle 18, in which a procedure is performed by a person other than the user for quickly moving the automatically driven vehicle 18.

In the notification process, first, in S110, the abnormality determiner 47A of the management device 39 inspects the automatically driven vehicle 18 or monitors the state of the automatically driven vehicle 18. For example, the inspection of the automatically driven vehicle 18 is performed at a timing when the automatically driven vehicle 18 is going to be moved to the parking area 7, after arriving at the park-in lot 3, and getting off of the user from the automatically driven vehicle 18. In the inspection in such case, whether a size of the automatically driven vehicle 18 and the like conforms to the parking facility, whether or not a preset standard is satisfied, in terms of a state of the automatically driven vehicle 18, e.g., a travelable distance, a device failure, and the like is checked. The abnormality determiner 47A determines that the inspection is either passed or not passed.

Further, the monitoring of the state of the automatically driven vehicle 18 is always performed during the move of the automatically driven vehicle 18, for example. In the monitoring in such case, it is determined whether or not the automatically driven vehicle 18 is traveling without deviating from the designated guidance route, and whether or not the automatically driven vehicle 18 has a failure, an error, or the like. The abnormality determiner 47A determines that the automatically driven vehicle 18 has an abnormality, when the inspection is not passed, when the vehicle deviates from the guidance route, when a problem occurs in the automatically driven vehicle 18 or when finding a similar situation.

Subsequently, in S120, the abnormality determiner 47A determines whether or not the automatically driven vehicle 18 has an abnormality. When the abnormality determiner 47A determines no abnormality in S120, the process proceeds to S130, and the management device 39 determines whether or not the move is complete. The management device 39 determines, when receiving from the automatically driven vehicle 18 either (i) a park-in completion notification that the parking the vehicle 18 into a certain section of the parking area 7 is complete, (ii) a park-out completion notification that the parked vehicle 18 brought out from the certain section of the parking area 7 is complete, or (iii) a move completion notification that the move within the parking area 7 is complete. When the management device 39 has not received any of these notifications, it determines that the move has not been complete.

When the management device 39 determines in S130 that the move is not complete, the management device 39 returns the process to S110. On the other hand, when the management device 39 determines in S130 that the move is complete, the management device 39 ends the notification process of FIG. 4.

Further, when the management device 39 determines that some abnormality in S120, the management device 39 shifts the process to S135, and the distance detector 47F detects a distance between the portable terminal device 45 and a collection position. Here, the collection position is a position where the automatically driven vehicle 18 is stopped or a position where the automatically driven vehicle 18 is about to stop, and is also a position where the user should move in order to get on the automatically driven vehicle 18.

When the automatically driven vehicle 18 is positioned in the park-in lot 3, the collection position is set to the park-in lot 3. Further, when the automatically driven vehicle 18 is moving, it is set to a target position where the automatically driven vehicle 18 is planned to arrive at, mainly in the park-out lot 5.

When there are a plurality of sections in the park-in lot 3 and the park-out lot 5, the collection position indicates a position of the section in which the automatically driven vehicle 18 is stopped or the section set as the target position. The section that is set as the target position is also a section where the automatically driven vehicle 18 is about to stop.

When the distance detector 47F measures a distance between the portable terminal device 45 and the collection position, a linear distance therebetween may be measured, and at the time of such measurement, a distance in the three-dimensional space or a distance in the two-dimensional plane may be measured.

Subsequently, the notification setter 47E of the management device 39 sets a notification interval in S140. The notification interval is an interval for performing the notification when the notification in S160 described later is repeatedly performed, and is set according to an arbitrary condition set in advance. Here, for example, the notification setter 47E sets a shorter notification interval as time lapses from the start of the notification, and sets a longer notification interval as a distance between the portable terminal device 45 and the collection position gets shorter.

The time lapsed from the start of the notification is, for example, a time from performing S160, which is described later, to the current time. The notification setter 47E changes the notification interval as time lapses, for example, every 5 minutes for the first 10 minutes, every 3 minutes for the next 6 minutes, and every 1 minute thereafter.

However, for example, if the distance between the portable terminal device 45 and the collection position is getting shorter than the previous notification time, the notification setter 47E may refrain from changing the notification interval to a shorter interval, or may change an amount of change of the notification interval to a smaller value. That is, when the distance between the portable terminal device 45 and the collection position is getting shorter, the notification interval may be set to be longer than when the distance between the portable terminal device 45 and the collection position is not getting shorter.

Subsequently, in S150, the notification instructor 47B of the management device 39 determines whether or not it is a notification timing. In other words, the notification instructor 47B determines whether or not the time specified as the notification interval has lapsed from the previous notification.

When the notification instructor 47B determines in S150 that it is the notification timing, it shifts the process to S160, and performs notification. Here, the notification instructor 47B issues a notification instruction for the portable terminal device 45 held by the user of the automatically driven vehicle 18, notifying contents including (i) collection information indicating a collection position of the automatically driven vehicle 18, and (ii) prompter information prompting that the user should go to the collection position. The instruction from the notification instructor 47B is received by the control circuit 45B. In response to this instruction, the notifier 45A of the portable terminal device 45 displays an image in accordance with the instruction on the display of the portable terminal device 45, and draws user's attention by a sound output from the speaker.

Figure 5:
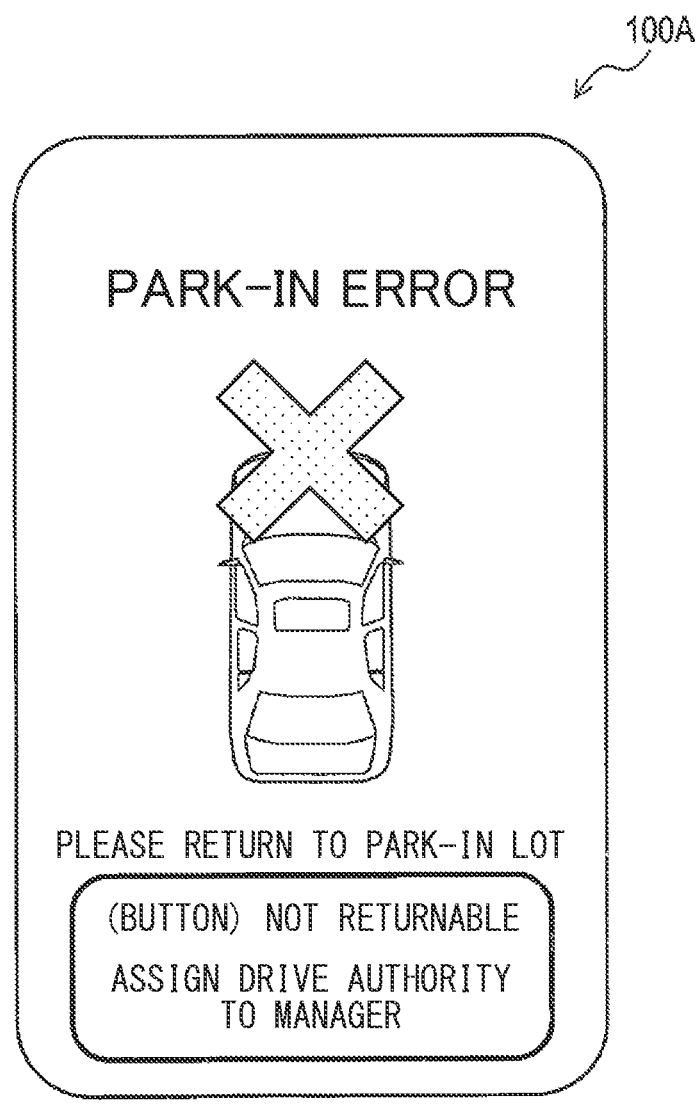
FIG. 5 is an image diagram showing a notification image in an embodiment.

Specifically, for example, FIG. 5 shows an example of a notification image displayed on the portable terminal device 45. A notification image 100A shown in FIG. 5 is a display example when some error occurs during the move at the time of parking. The notification image 100A includes, for example, a picture of a vehicle, an X symbol indicating that a park-in operation is not performable over the picture of the vehicle, contents of the abnormality as the prompter information, a message prompting the user to return to the park-in lot, and a drive authority assign button.

The drive authority assign button is an approval content requesting the user for approval of the use of the virtual key, and includes at least one of text and an image. The virtual key is different from a remote control key and the like, which is tied to the automatically driven vehicle 18 that can be used at all times, and is a rewritable remote control key, which is a smartphone or the like temporarily assigning an authority to use the vehicle 18 to the device 96 held by the manager of the parking facility. The virtual key is hereinafter referred to as a digital key.

When the user performs an operation such as tapping the drive authority assign button on the notification image 100A, the management device 39 performs a process that assigns the authority to drive the automatically driven vehicle 18 to the device 96 held by the manager of the parking facility, i.e., a process of validating the digital key. Note that, as shown in FIG. 2, the digital key is acquired by the management device 39 from a key distribution server 91 connected to the management device 39 via the Internet network 95, is transmitted to the device 96, and is set as a digital key.

At this time, the processing unit 97 of the device 96 receives the digital key, stores the received digital key in the recording unit 98, and makes the digital key usable. However, the timing at which the management device 39 acquires the digital key from the key distribution server 91 is arbitrary.

When the digital key is assigned in such manner, the manager of the parking facility can drive the automatically driven vehicle 18 by using the device 96 authorized to drive. Note that the technique of assigning a digital key to the device 96 so that the vehicle can be driven is standardized as Digital Key 1.0 or 2.0 or the like. After the processing of S160, the process shifts to S210.

When the management device 39 determines in S150 that it is not the notification timing, the process shifts to S210, and the arrival detector 47D determines whether or not it has detected that the user has moved to the park-in or park-out lot which is the collection position. Note that the arrival detector 47D is configured to detect that the user has arrived at the collection position by monitoring the position of the portable terminal device 45. Alternatively, the arrival detector 47D may be a camera that captures an image of the inside of the park-in or park-out lot or a space through which the user enters into and exits from the park-in or park-out lot. In this case, the arrival detector 47D is configured to detect that the user has arrived at the collection position by monitoring whether or not an occupant is present in the park-in or park-out lot.

When the management device 39 determines that the user has moved, i.e., has returned, to the park-in or park-out lot in S210, the management device 39 shifts the process to S220, and transmits an instruction to the portable terminal device 45 to end the notification. Upon receiving the instruction to end the notification, the portable terminal device 45 ends the display of the notification image 100A. After the process of S220, the notification process of FIG. 4 ends.

On the other hand, when the management device 39 determines in S210 that it has not detected that the user has moved to the park-in or park-out lot, the management device 39 shifts the process to S230, and determines if there has been a notification indicating that the user cannot move/return to the park-in or park-out lot, in other words, that the user is not returnable. Note that a function of the management device 39 for receiving the notification which notifies that the user cannot return corresponds to a notification receiving unit in the present disclosure.

When the management device 39 determines that there is no notification notifying that the user cannot return in S230 (NO in S230), the management device 39 shifts the process to S240, and determines whether or not a preset time has lapsed from the start of the notification. When the management device 39 determines in S240 that the preset time set in advance has not lapsed from the start of the notification in S160, the management device 39 returns the process to S135.

On the other hand, when the management device 39 determines in S230 that there is a notification that the user cannot return (YES in S230), or determines in S240 that a preset time has lapsed from the start of the notification in S160 (YES in S240), the management device 39 shifts the process to S250, and determines whether any permission to assign the digital key exists.

On the other hand, the management device 39 shifts the process to S250, and determines whether or not a permission to assign the digital key exists. The management device 39 determines that a permission to assign the digital key exists when the drive authority assign button has been operated by the user.

Figure 4:
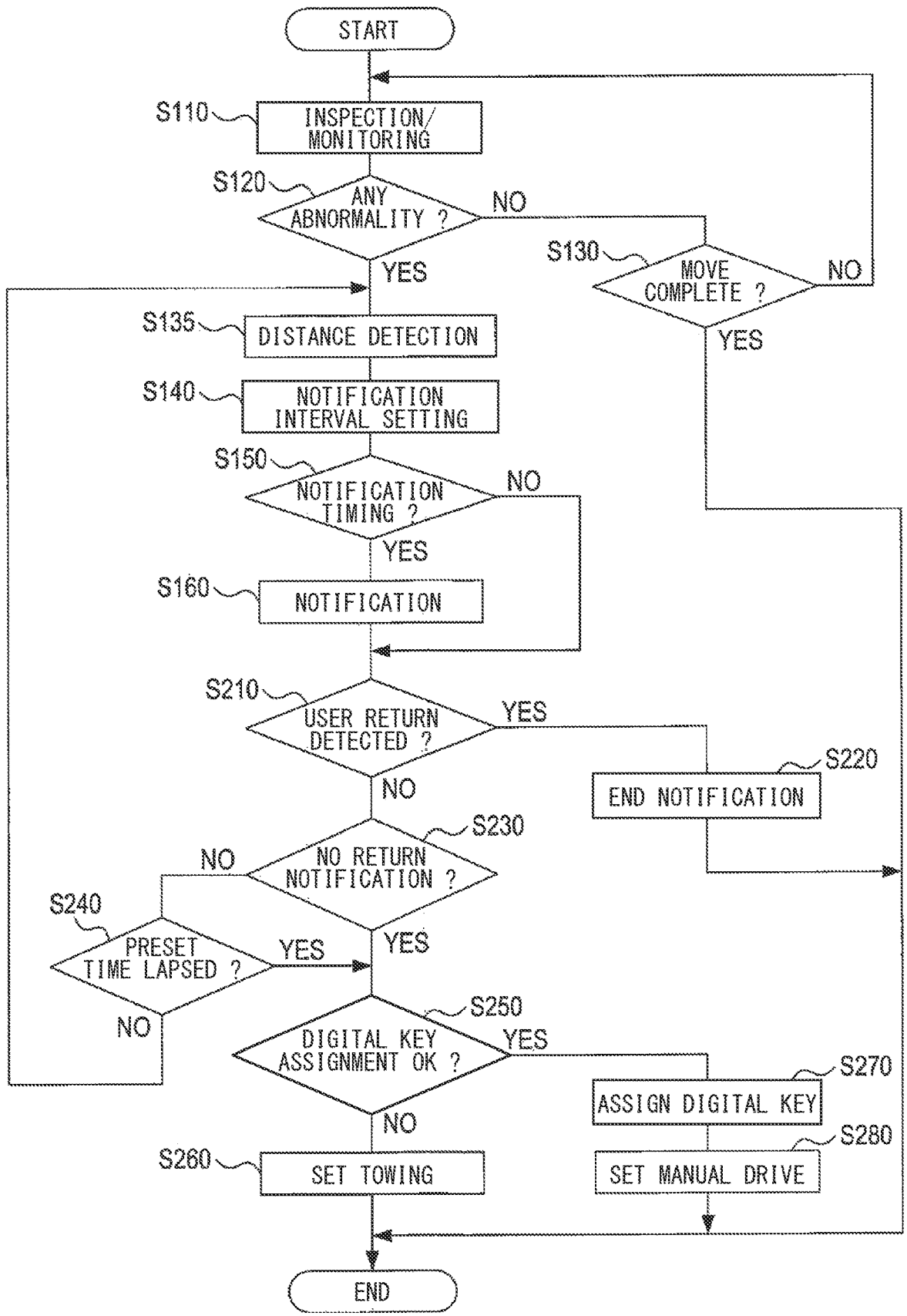
FIG. 4 is a flowchart of a notification process performed by the management device.

When the management device 39 determines no permission to assign the digital key in S250, the management device 39 shifts the process to S260, sets the automatically driven vehicle 18 to be towed, and then ends the notification process of FIG. 4. As a setting for moving the automatically driven vehicle 18 by a tow truck, for example, it is conceivable to transmit to the manager of the parking facility a notification that the user is not returnable to the park-in or park-out lot, thereby requesting towing.

On the other hand, when the management device 39 determines in S250 a permission to assign the digital key, the management device 39 shifts the process to S270, and the manual setter 47C assigns a digital key to a device held by the manager of the parking facility.

Subsequently, in S280, the manual setter 47C establishes a setting that the automatic automatically driven vehicle 18 is manually drivable using the digital key. After that, the notification process of FIG. 4 ends.

1-3. Advantageous Effects

The present embodiment can achieve the following advantageous effects.

(1a) One aspect of the present disclosure provides the management device 39 configured to support parking of the automatically driven vehicle in the parking facility. The automatically driven vehicle 18 is a vehicle configured to perform automatic driving along a guidance route set by the management device 39 in the parking facility having the park-in lot 3, the park-out lot 5 and the parking area 7 respectively provided with a plurality of sections.

The management device 39 includes the abnormality determiner 47A and the notification instructor 47B. The abnormality determiner 47A is configured to determine the presence or absence of an abnormality in the automatically driven vehicle 18 when the automatically driven vehicle 18 moves by automatic driving in the parking facility. When determining an abnormality, the notification instructor 47B issues a notification instruction for the portable terminal device 45 held by the user of the automatically driven vehicle 18, notifying contents including (i) the collection information indicating a collection position where the user should collect (e.g., picks up or gets in) the automatically driven vehicle 18, and (ii) the prompter information prompting that the user should go to the collection position. Note that "when moving by automatic driving" means when the automatic automatically driven vehicle 18 moves by automatic driving without being operated by the user or the like after the user gets off from the vehicle 18, including an occasion of stop of the vehicle in the park-in lot, or an occasion of moving along the guidance route.

According to such a configuration, via the portable terminal device 45 held by the user, the park support device can notify the user of the collection position and can notify the user to go to the collection position quickly, for example, to move the automatically driven vehicle 18. Therefore, even when an abnormality occurs in a certain automatically driven vehicle 18, it is possible for the park support device to be less prone to hinder the move of other automatically driven vehicles 18.

(1b) In one aspect of the present disclosure, the notification instructor 47B is configured to issue a notification instruction for notifying the content including information for identifying a section where the automatically driven vehicle 18 is stopped in the park-in and park-out lots 3 and 5 as the collection information.

According to such a configuration, since it is possible to identify and notify the section where the automatically driven vehicle 18 is stopped, it is possible to guide the user to that section without getting lost.

(1c) In one aspect of the present disclosure, the notification instructor 47B is configured to issue a notification instruction for notifying the contents including information for identifying a section where the automatically driven vehicle 18 is about to stop in the park-in and park-out lots 3 and 5 as the collection information.

According to such a configuration, since it is possible to identify and notify the section where the automatically driven vehicle 18 is about to stop, it is possible to guide the user to that section without getting lost.

(1d) In one aspect of the present disclosure, the notification instructor 47B is configured to issue, as the prompter information, a notification instruction notifying contents including at least one of (i) the content of the abnormality of the automatically driven vehicle 18, (ii) a time limit by which the user should arrive at the collection position, and (iii) an additional fee charged to the user.

According to such a configuration, since the prompter information includes information that prompts the user to go to the collection position, the parking support device can move the user to the collection position at an earlier timing.

(1e) In one aspect of the present disclosure, the notification instructor 47B is configured to issues a notification instruction to notify the user of an approval content requesting the user for approval of the use of the virtual key by a person other than the user, i.e., for the use of the virtual key for manually driving the automatically driven vehicle 18. The manual setter 47C is configured to set, when the use of the virtual key is approved by the portable terminal device 45, the automatic automatically driven vehicle 18 to be manually driven by using the virtual key.

According to such a configuration, when determining an abnormality, the approval content requesting the use of the virtual key is notified, thereby enabling the user to operate the portable terminal device 45 for such approval and for requesting the manager of the parking facility or the like to move the automatically driven vehicle 18.

(1f) In one aspect of the present disclosure, the manual setter 47C is configured to assign an authority to drive the automatically driven vehicle 18 to a device held by a person other than the user.

According to such a configuration, it is possible to establish a setting with which a person other than the user is enable to drive the automatically driven vehicle 18 temporarily (i.e., on demand) by using his/her device.

(1g) In one aspect of the present disclosure, the arrival detector 47D is configured to detect that the user has arrived at the collection position. The notification instructor 47B repeatedly issues an instruction at preset notification intervals until the user arrives at the collection position.

According to such a configuration, it is possible to repeatedly notify the user until the user arrives at the collection position. Therefore, it is possible to prompt the user to move to the collection position at an earlier timing.

(1h) In one aspect of the present disclosure, the notification setter 47E is configured to set the notification interval according to the preset condition. The notification instructor 47B is configured to repeatedly issue an instruction at the notification interval set by the notification setter 47E.

According to such a configuration, the notification interval can be arbitrarily set according to a preset condition, that is, according to a situation.

(1i) In one aspect of the present disclosure, the notification setter 47E is configured to set the shorter notification interval as time lapses.

According to such a configuration, it is possible to urge the user to move to the collection position more strongly as time lapses.

(1j) In one aspect of the present disclosure, the distance detector 47F is configured to repeatedly detect the distance between the portable terminal device 45 and the collection position. The notification setter 47E is configured to set the longer notification interval as the distance between the portable terminal device 45 and the collection position gets shorter.

According to such a configuration, when the distance between the portable terminal device 45 and the collection position gets shorter, the frequency of notification can be lowered, in a situation where the user seemingly intends to go to the collection position. In such manner, it is possible to stop bothering the user with the frequent notifications.

(1k) In one aspect of the present disclosure, the management device 39 is configured to receive a notification that the user cannot return to the automatically driven vehicle 18, which is input via the portable terminal device 45 as a response to the notification regarding the prompter information.

According to such a configuration, when the user cannot return to the automatically driven vehicle 18 or has no intention of returning, it is possible to transmit such a notification to the management device 39 as the one conveying that the user has no intention of returning. Therefore, the management device 39 having received the notification of no return can stop the notification prompting the move of the automatically driven vehicle 18, or can request a person other than the user to move the automatically driven vehicle 18 on behalf of the user.

(1l) One aspect of the present disclosure is the portable terminal device 45 held by the user of the automatically driven vehicle 18. The portable terminal device 45 includes the control circuit 45B and the notifier 45A. When the automatically driven vehicle 18 moves by automatic driving in the parking facility, the management device 39 determines whether an abnormality exists in the automatically driven vehicle 18.

The control circuit 45B is configured to receive, from the management device 39, an instruction for notifying the contents including the collection information and the prompter information, when the management device 39 determines that the automatically driven vehicle 18 has an abnormality. The collection information is information indicating the collection position where the user should collect the automatically driven vehicle 18. The prompter information is information requesting the user to go to the collection position. The notifier 45A is configured to notify the user by using image or voice based on an instruction for notifying the content including the collection information and the prompter information.

According to such a configuration, since the portable terminal device 45 receives an instruction from the management device 39 to notify the contents including the collection information and the prompter information, such a notification is appropriately conveyable to the user by using the notifier 45A.

2. Other Embodiments

Although the embodiments of the present disclosure have been described above, the present disclosure is not limited to the above-described embodiments, and various modifications can be made.

(2a) In the above embodiment, the notification image 100A is displayed at the time of notification, but the present disclosure is not limited to this.

For example, any notification image such as notification images 100B to 100E shown in FIGS. 6 to 9 may be adopted.

Figure 6:
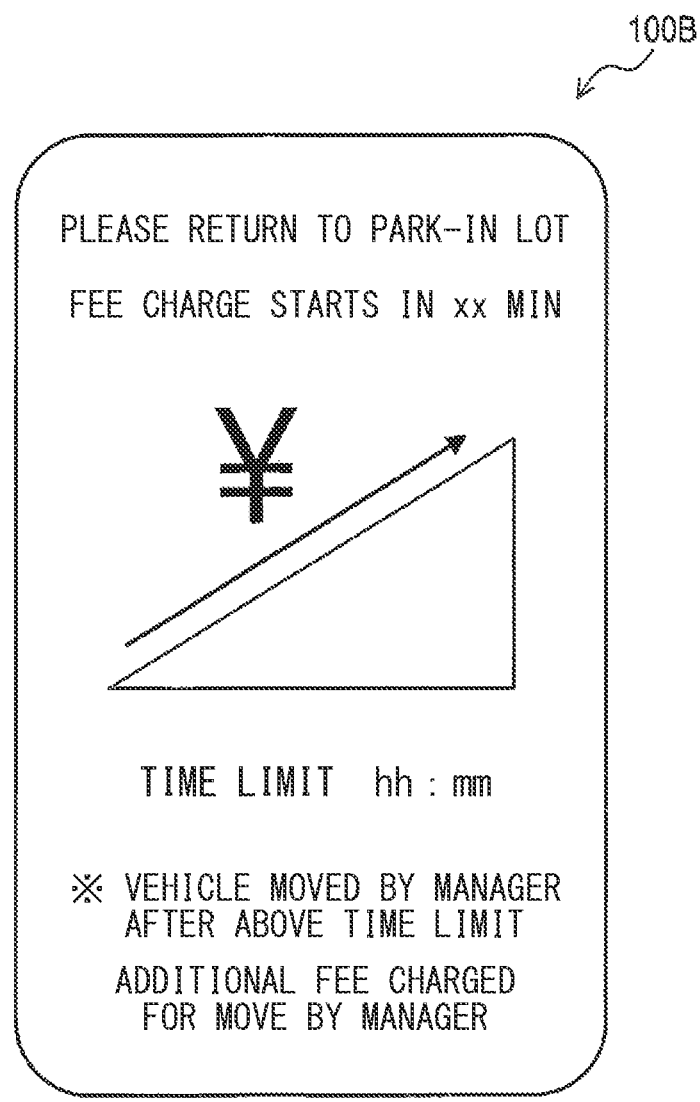
FIG. 6 is an image diagram showing a notification image in another embodiment.

The notification image 100B in FIG. 6 includes, as prompter information, a time before start of fee charging, an image and a message indicating that an additional fee changed for towing of a vehicle by a manager, and a message urging the user to return to the park-in lot. According to the notification image 100B, it is possible to motivate the user who is reluctant to pay for towing to return to the park-in lot promptly.

Figure 7:
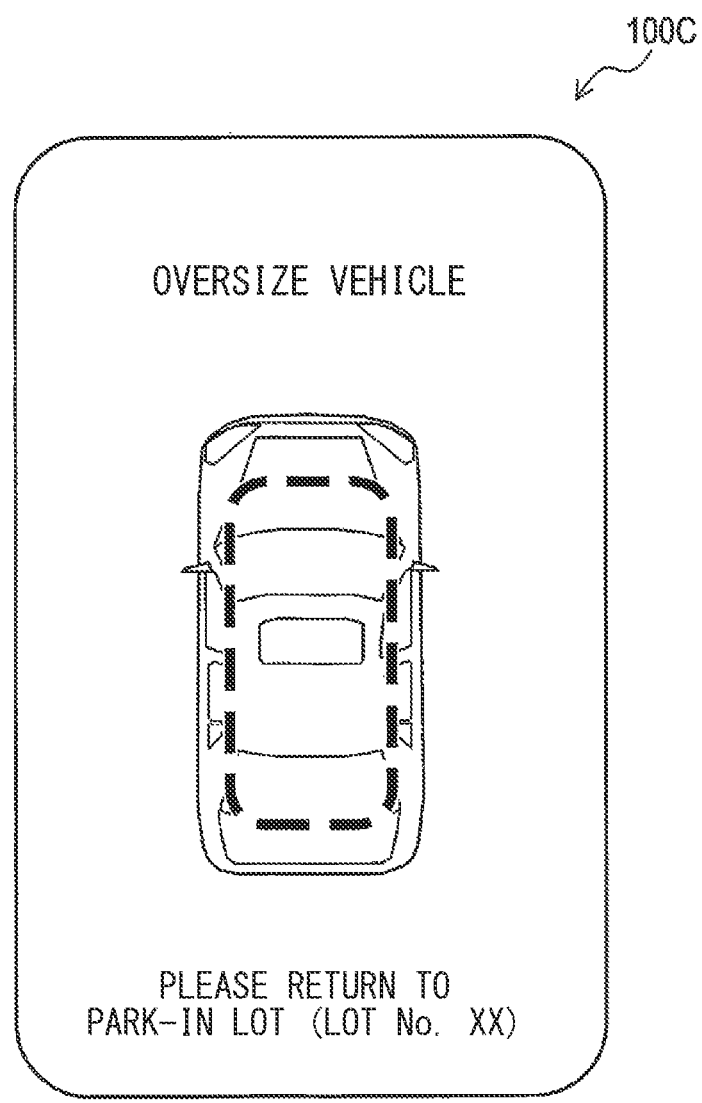
FIG. 7 is an image diagram showing a notification image in yet another embodiment.

The notification image 100C in FIG. 7 is a display example when the inspection before parking is not passed, including a vehicle image, a broken line frame superposed on the vehicle image indicating that the vehicle is oversized, i.e., the vehicle is bigger than the size of the parking position in the parking area 7, and the park-in lot number as the collection information, the contents of the abnormality as the prompter information, and a message urging the user to return to the park-in lot.

In this example, since the park-in lot number is included in the information, a target lot where the user should return is notified to the user in an easy-to-understand manner.

Figure 8:
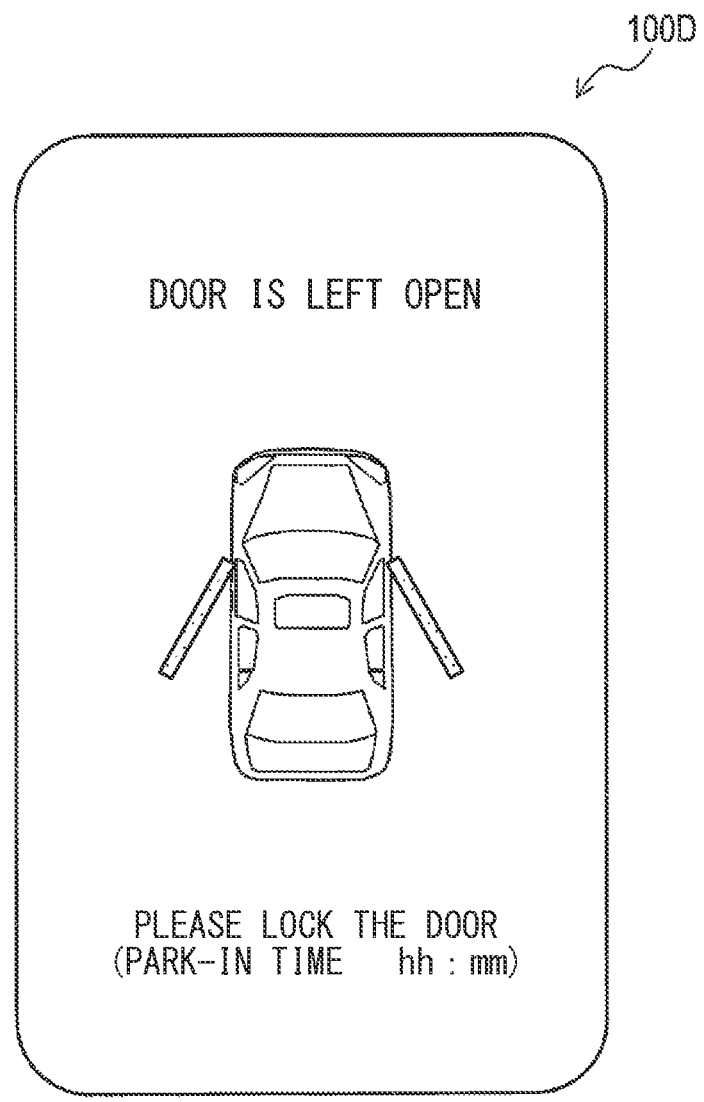
FIG. 8 is an image diagram showing a notification image in still yet another embodiment.

The notification image 100D in FIG. 8 includes, as the prompter information, the content of the abnormality that the door of the vehicle is left open, a message of how to solve the situation, i.e., return to the vehicle and lock the door, and a park-in time.

Figure 9:
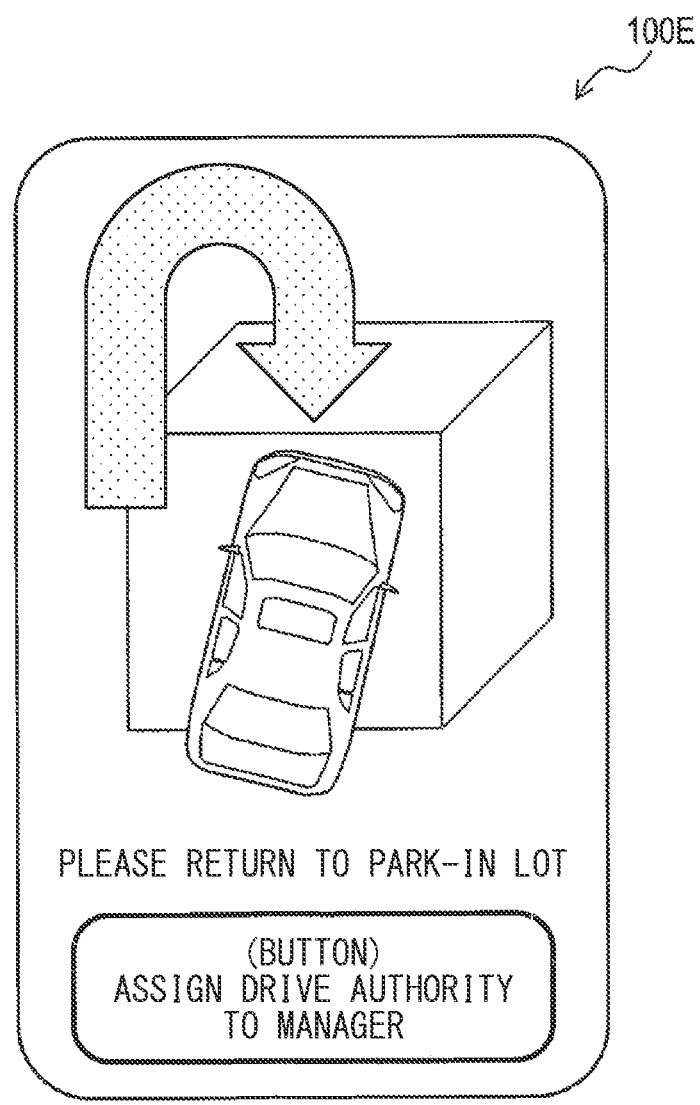
FIG. 9 is an image diagram showing a notification image in still yet another embodiment.

The notification image 100E in FIG. 9 includes, as the prompter information, an image of the vehicle making a U-turn and a driving authority assign button. With these notification images 100B to 100E, the user can also be similarly prompted to move to the collection position.

(2b) The control unit 47 and methods thereof described in the present disclosure may be realized by a dedicated computer provided by configuring a processor and a memory programmed to perform one or more functions embodied by a computer program.

Alternatively, the control unit 47 and the method described in the present disclosure may be realized by a dedicated computer which is configured with a processor with one or more dedicated hardware logic circuits.

Alternatively, the control unit 47 and the method described in the present disclosure may be realized by one or more dedicated computers which is configured as a combination of (i) a processor and a memory programmed to execute one or more functions and (ii) a processor with one or more hardware logic circuits.

Further, a computer program may be stored in a computer-readable, non-transitory, tangible storage medium as instructions to be executed by the computer.

The technique for realizing the functions of each unit included in the control unit 47 does not necessarily include software, and all the functions may be realized using one or more hardware circuits.

(2c) The multiple functions of one component in the above embodiments may be realized by multiple components, or a function of one component may be realized by multiple components. In addition, multiple functions of multiple components may be realized by one component, or a single function realized by multiple components may be realized by one component. Further, a part of the configuration of the above embodiment may be omitted. Further, at least a part of the configuration of the above-described embodiment may be added to or replaced with the configuration of other embodiment described above.

(2d) In addition to the parking support system 1 described above, the present disclosure may also be realized in various forms such as a system having the parking support system 1 as a component, a program for operating a computer as the parking support system 1, a non-transitory, tangible memory medium such as a semiconductor memory recording the program, a parking support method, and the like.

What is claimed is:

1. A parking support device supporting an automatic valet parking of a vehicle, the vehicle provided as automatically driven vehicle configured to be capable of performing automatic driving along a guidance route set by the parking support device in a parking facility having a getting on-off area and a parking area respectively provided with a plurality of sections, the parking support device comprising:
    an abnormality determiner configured to determine whether an abnormality exists in a control system of the automatically driven vehicle when the automatically driven vehicle moves in the parking facility by automatic driving; and
    a notification instructor configured to issue, when determining that an abnormality exists, a notification instruction for a portable terminal device held by a user of the automatically driven vehicle, the notification instruction causing the portable terminal device to notify the user of contents including (i) collection information indicating a collection position where the user should collect the automatically driven vehicle, and (ii) prompter information prompting that the user should go to the collection position, wherein
    the notification instructor issues, as the prompter information, the notification instruction for notifying the user of contents including at least one of (i) abnormality of the automatically driven vehicle, (ii) a time limit by which the user should arrive at the collection position, and (iii) an additional fee charged to the user,
    wherein the parking support device comprises
        a processor capable of executing a computer program; and
        a memory connected to the processor and storing the computer program,
    wherein the processor implements the abnormality determiner and the notification instructor by executing the computer program stored in the memory, and
    wherein the abnormality determiner determines whether an abnormality exists in the automatically driven vehicle based on data obtained from at least one of a sensor measuring size of the automatically driven vehicle in a park-in lot of the getting on-off area, a camera imaging interior of the parking facility, and a LIDAR imaging the interior of the parking facility.

2. The parking support device according to claim 1, wherein
the notification instructor issues the notification instruction to notify the user of, as the collection information, contents including information for identifying one of the plurality of sections where the automatically driven vehicle is stopped.

3. The parking support device according to claim 1, wherein
the notification instructor issues the notification instruction to notify the user of, as the collection information, contents including information for identifying one of the plurality of sections where the automatically driven vehicle is about to stop.

4. A parking support method performed by a parking support device that is configured to support an automatic valet parking of a vehicle, the vehicle being an automatically driven vehicle configured to be capable of performing automatic driving along a guidance route set by the parking support device in a parking facility having a getting on-off area and a parking area respectively provided with a plurality of sections, the parking support method comprising steps of:
determining whether an abnormality exists in a control system of the automatically driven vehicle when the automatically driven vehicle moves in the parking facility by automatic driving; and
issuing, when determining an abnormality, a notification instruction for a portable terminal device, the notification instruction causing the portable terminal device to notify the user of contents including (i) collection information indicating a collection position where the user should collect the automatically driven vehicle, and (ii) prompter information prompting that the user should go to the collection position, wherein
the contents include, as the prompter information, at least one of (i) the abnormality of the automatically driven vehicle, (ii) a time limit by which the user should arrive at the collection position, and (iii) an additional fee charged to the user,
wherein the parking support device comprises
a processor capable of executing a computer program; and
a memory connected to the processor and storing the computer program,
wherein the processor implements determining whether the abnormality exists and issuing the notification instruction by executing the computer program stored in the memory, and
wherein the abnormality is determined to exist in the automatically driven vehicle based on data obtained from at least one of a sensor measuring size of the automatically driven vehicle in a park-in lot of the getting on-off area, a camera imaging interior of the parking facility, and a LiDAR imaging the interior of the parking facility.

5. A parking support system comprising:
a parking support device configured to support an automatic valet parking of a vehicle; and
a portable terminal device held by a user of an automatically driven vehicle, wherein
the automatically driven vehicle is configured to be capable of performing automatic driving along a guidance route that is set by the parking support device in a parking facility having getting on-off areas and a parking area respectively provided with a plurality of sections,
the parking support device includes:
an abnormality determiner configured to determine whether an abnormality exists in a control system of the automatically driven vehicle when the automatically driven vehicle moves in the parking facility by automatic driving; and
a notification instructor configured to issue, when determining that an abnormality exists, a notification instruction for the portable terminal device, the notification instruction causing the portable terminal device to notify the user of contents including (i) collection information indicating a collection position where the user should collect the automatically driven vehicle, and (ii) prompter information prompting that the user should go to the collection position,
the portable terminal device includes:
a notifier configured to notify the user of the collection information and the prompter information upon receiving the notification instruction notifying contents including the collection information and the prompter information, and
the contents include, as the prompter information, at least one of (i) the abnormality of the automatically driven vehicle, (ii) a time limit by which the user should arrive at the collection position, and (iii) an additional fee charged to the user,
wherein the parking support device comprises
a processor capable of executing a computer program; and
a memory connected to the processor and storing the computer program,
wherein the processor implements the abnormality determiner and the notification instructor by executing the computer program stored in the memory, and
wherein the abnormality determiner determines whether an abnormality exists in the automatically driven vehicle based on data obtained from at least one of a sensor measuring size of the automatically driven vehicle in a park-in lot of the getting on-off area, a camera imaging interior of the parking facility, and a LIDAR imaging the interior of the parking facility.

6. A non-transitory, tangible storage medium storing a program of computer-readable instructions to be executed by a computer that is included in a parking support device configured to support an automatic valet parking, the instructions comprising steps of:
implementing a determining function for determining whether an abnormality exists in a control system of an automatically driven vehicle when the automatically driven vehicle that is configured to be capable of performing automatic driving along a guidance route moves by the automatic driving in a parking facility having getting on-off areas and a parking area respectively provided with a plurality of sections; and
implementing an issuing function for issuing, when determining an abnormality, a notification instruction for a portable terminal device held by a user of the automatically driven vehicle, the notification instruction causing the portable terminal device to notify the user of contents including (i) collection information indicating a collection position where the user should collect the automatically driven vehicle, and (ii)

prompter information prompting that the user should go to the collection position, wherein the contents include, as the prompter information, at least one of (i) the abnormality of the automatically driven vehicle, (ii) a time limit by which the user should arrive at the collection position, and (iii) an additional fee charged to the user, wherein the parking support device comprises
- a processor capable of executing a computer program; and
- a memory connected to the processor and storing the computer program, wherein the processor implements determining whether the abnormality exists and issuing the notification instruction by executing the computer program stored in the memory, and wherein the abnormality is determined to exist in the automatically driven vehicle based on data obtained from at least one of a sensor measuring size of the automatically driven vehicle in a park-in lot of the getting on-off area, a camera imaging interior of the parking facility, and a LiDAR imaging the interior of the parking facility.

7. A portable terminal device held by a user of an automatically driven vehicle, which is configured as a vehicle capable of performing automatic driving along a guidance route that is set by a parking support device supporting an automatic valet parking of the vehicle in a parking facility provided with getting on-off areas and a parking area respectively having a plurality of sections, the portable terminal device comprising:

a control circuit, when the automatically driven vehicle moves by automatic driving in the parking facility and the parking support device has determined that a control system of the automatically driven vehicle has an abnormality, configured to receive a notification instruction for notifying the user of contents including (a) collection information and (b) prompter information, the collection information indicative of a collection position at which the user should collect the automatically driven vehicle and the prompter information indicating that the user should go to the collection position; and a notifier configured to provide notification to the user by using image or voice based on the notification instruction, wherein the contents include, as the prompter information, at least one of (i) the abnormality of the automatically driven vehicle, (ii) a time limit by which the user should arrive at the collection position, and (iii) an additional fee charged to the user, wherein the parking support device comprises
- a processor capable of executing a computer program; and
- a memory connected to the processor and storing the computer program, wherein the processor implements determining the abnormality and issuing the notification instruction by executing the computer program stored in the memory, and wherein the abnormality is determined to exist in the automatically driven vehicle based on data obtained from at least one of a sensor measuring size of the automatically driven vehicle in a park-in lot of the getting on-off area, a camera imaging interior of the parking facility, and a LiDAR imaging the interior of the parking facility.

* * * * *